United States Patent
Zrelli et al.

(10) Patent No.: US 8,984,145 B2
(45) Date of Patent: Mar. 17, 2015

(54) NETWORK MANAGEMENT INTERFACE FOR HETEROGENEOUS DATA NETWORK AND SYSTEM USING THE SAME

(75) Inventors: Saber Zrelli, Musashino (JP); Masato Yamaji, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 18 days.

(21) Appl. No.: 13/284,097

(22) Filed: Oct. 28, 2011

(65) Prior Publication Data
US 2013/0110998 A1 May 2, 2013

(51) Int. Cl.
| | |
|---|---|
| *G06F 15/16* | (2006.01) |
| *H04L 29/08* | (2006.01) |
| *H04L 12/24* | (2006.01) |
| *H04L 29/06* | (2006.01) |

(52) U.S. Cl.
CPC ........ *H04L 67/2823* (2013.01); *H04L 41/0226* (2013.01); *H04L 41/0233* (2013.01); *H04L 67/125* (2013.01); *H04L 69/08* (2013.01)
USPC ............................ 709/227; 709/223; 709/230

(58) Field of Classification Search
CPC ... H04L 41/0213; H04L 41/22; H04L 41/046; H04L 41/0803; H04L 41/0893; H04L 41/12; H04L 41/0226; H04L 41/0233; H04L 41/0853; H04L 67/125; H04L 12/24; H04L 12/2807; H04L 41/00; H04L 41/082
USPC ........................................................ 709/223
See application file for complete search history.

(56) References Cited

U.S. PATENT DOCUMENTS

| | | | |
|---|---|---|---|
| 5,063,523 A | 11/1991 | Vrenjak | |
| 5,109,486 A | 4/1992 | Seymour | |
| 5,394,522 A | 2/1995 | Sanchez-Frank et al. | |
| 5,751,933 A | 5/1998 | Dev et al. | |
| 5,822,532 A | 10/1998 | Ikeda | |
| 6,584,499 B1* | 6/2003 | Jantz et al. | 709/220 |
| 6,769,022 B1* | 7/2004 | DeKoning et al. | 709/223 |
| 7,398,307 B2* | 7/2008 | Dorland | 709/223 |
| 7,606,884 B2* | 10/2009 | Palmer et al. | 709/223 |
| 7,640,325 B1* | 12/2009 | DeKoning et al. | 709/223 |
| 7,827,317 B2* | 11/2010 | Baldwin et al. | 709/249 |
| 2005/0080886 A1 | 4/2005 | Croy et al. | |
| 2006/0123103 A1* | 6/2006 | Shankar et al. | 709/223 |
| 2008/0098103 A1* | 4/2008 | Packiam | 709/223 |
| 2010/0106817 A1* | 4/2010 | Jang | 709/223 |
| 2011/0087766 A1* | 4/2011 | Kuo et al. | 709/224 |

FOREIGN PATENT DOCUMENTS

| | | |
|---|---|---|
| EP | 1 241 828 A1 | 9/2002 |
| EP | 2 169 912 A2 | 3/2010 |

OTHER PUBLICATIONS

Extended European Search Report dated Jan. 17, 2013 issued in European Application No. 11196048.0-2413.

* cited by examiner

*Primary Examiner* — Douglas W Owens
*Assistant Examiner* — Monica C King
(74) *Attorney, Agent, or Firm* — Sughrue Mion, PLLC

(57) ABSTRACT

An apparatus for managing network objects in a heterogeneous network, a network management system and a network management apparatus are provided. The apparatus includes processor that receives, using a first protocol communicated using a communications protocol, a network management request to manage a network object in the heterogeneous network, and that transmits, according to a second protocol that is different than the first protocol, the network management request to the network object network management interface is provided.

20 Claims, 12 Drawing Sheets

NETWORK MANAGEMENT INTERFACE FOR HETEROGENEOUS DATA NETWORK AND SYSTEM USING THE SAME

BACKGROUND

1. Field

Apparatuses, devices and systems consistent with exemplary embodiments relate to management of computer networks and, more specifically, to network management apparatuses, management protocols and systems using the same.

2. Description of the Related Art

Computer networks in enterprise and industrial environments include multiple network objects. FIG. 1 illustrates a generic example of a computer network. The network 100 includes various network objects. For example, the network objects may include infrastructure devices such as router/firewall 140; switches 120, 130, 150; access points 132, 134, 136; and wireless LAN controllers (WLC) 125. The network objects may also include various computing devices, such as servers 110; workstations (PCs) 170, 180; printers 160; and portable computing devices 133, 135 such as personal data assistants (PDAs) and mobile terminals. The network objects shown in FIG. 1 are not exhaustive, and new network objects capable of interacting over a network are constantly being developed by various manufacturers.

A network 100 typically does not include network objects from only one manufacture or running only one system. Rather, it is common to have network objects from many manufacturers and having different network management protocols together on one network. A network including these disparate elements is called a heterogeneous network.

One example of a heterogeneous network is in the industrial automation context. In an industrial network, field devices that include various sensors and control equipment used for monitoring a process may be provided by one or more manufacturers. These field devices may be connected to a switch that is purchased or otherwise provided from another manufacturer, and the switch may, in turn, be connected to a monitoring device made by another different manufacturer. Another example of a heterogeneous network may be a network found in an office networking environment which has several printers made by different manufacturers, one or more servers provided by another manufacturer, several network switches made by another manufacturer that provide connections to various workstations, which are perhaps manufactured by the same manufacturer of the servers or perhaps by a different manufacturer.

Additionally, particularly in an industrial automation setting, often legacy network objects, which have been in place for some time, and it is advantageous to add new network objects from different manufacturers to the network in order to provide for increased functionality.

As more and more network objects are added to the network, network related conflicts between network objects can develop and communication quality can degrade as new network objects add to the traffic on the network, create security issues, and communications quality issues, etc. Network management operations are performed with respect to the network objects in order to ensure that the network is properly configured and provisioned to maintain acceptable communication quality and security in the network.

In order to efficiently carry out network management, it is convenient if the network administrator can carry out the network management operations from a centralized location using a workstation. In such a case, the network administrator manages the network objects remotely using a single program. This program allows the network administrator to monitor the communication status of the network objects and to update network configuration information in the network objects to alter various network properties such as the network topology, quality of service parameters, and so on.

Thus, it is advantageous if the network administrator can be able to easily communicate with the network objects. Most network objects have a network management protocol that allows a network administrator to communicate with the network object from the management server to monitor and configure the network object so that the network administrators can carry out network management operations. Using the network management protocols, a network administrator can remotely monitor communication status and configure and update network configuration information in network objects. However, as discussed above, these network management protocols are typically different for different manufacturers, and one manufacturer or vendor may even provide different products that use different network management protocols. Additionally, as new network objects are added to increase functionality, legacy network objects and legacy network management protocols present challenges.

Thus, network management becomes difficult in the case of managing heterogeneous networks in which network objects are from different manufactures and use different network management protocols.

SUMMARY

According to an aspect of an exemplary embodiment, there is provided an apparatus for managing a plurality of network objects in a heterogeneous network, the apparatus comprising a central processing unit that receives, using a first protocol communicated using a communications protocol, a network management request to manage a network object in the heterogeneous network, and that transmits, according to a second protocol that is different than the first protocol, the network management request to the network object.

According to another aspect of an exemplary embodiment, there is provided a network management apparatus for managing a plurality of network objects in a heterogeneous network, the network management apparatus comprising a memory that stores a network object list comprising network management information associated with the plurality of network objects, the network management information comprising, for each of the network objects, a network management protocol associated with the network object; a central processing unit that receives a network management request using a management information. exchange protocol communicated over a communications protocol, and that transmits the network management request to a network object of the plurality of network objects specified in the network management request using the network management protocol associated with the network object in the network object list, wherein the network management protocol each are different than the management information exchange protocol.

According to another aspect of an exemplary embodiment, there is provided a network management system for managing a heterogeneous network, the network management system comprising a first network manager; and a first network management interface that is coupled to the network manager and to a first network object, and that is configured to communicate with the network manager using a first network management protocol transmitted over a communications protocol, and to communicate with the first network object according to a second network management protocol that is different from the first network management protocol.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
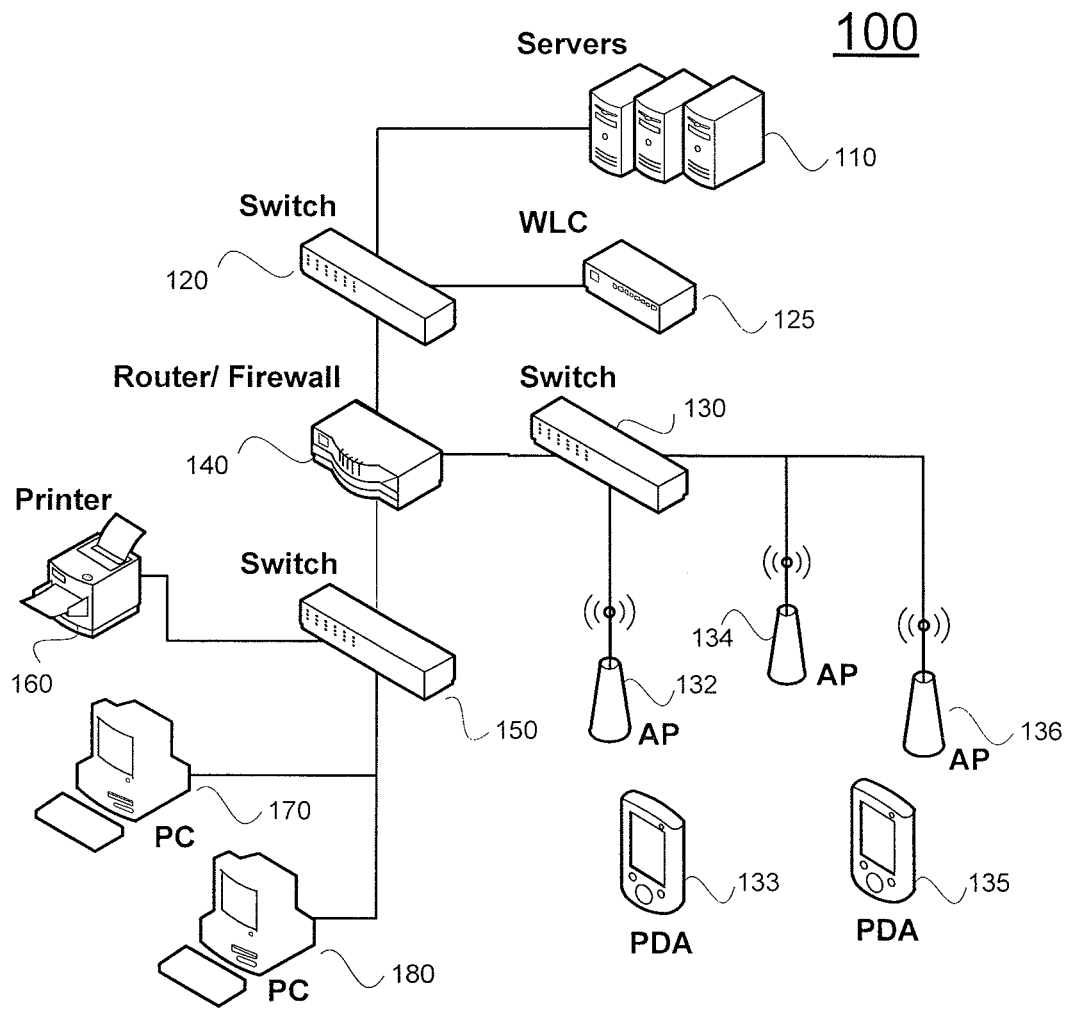
FIG. 1 is a diagram illustrating an example of network devices.

Exemplary embodiments are directed to computer networks, network management software, and network management systems which provide centralized access to network configuration and monitoring information in managed computer networks. Exemplary embodiments allow for exchanging network management information between centralized network management programs and managed network objects in heterogeneous networks.

There are two approaches to network management. The first approach is a two-tier approach in which a manager directly communicates with each of the network objects relying on pre-existing remote management protocols supported by the network objects on the network in order to configure and manage the network objects.

However, the two-tier approach has disadvantages such as increased firewall management overhead and increased vulnerability to security issues. When a manager directly exchanges network management information with network objects using different management protocols, several firewall rules need to be maintained in different firewalls to allow the corresponding data traffic to pass through. The maintenance of such firewall rules can become cumbersome for the network administrator using the manager. Moreover, in cases in which the pre-existing network management protocols supported by the network objects do not provide adequate confidentiality and integrity of communications, the manager and the network objects become exposed to network security threats.

The two-tier approach also have disadvantages in that the two-tier approach results in interruptions when adding new network objects and have difficulty with scalability, particularly in a heterogeneous network environment. For example, when a network object that uses a new network management protocol is added to the network, the manager needs to be altered to support the new protocol. As a result, the manager must be taken offline in order to test and perform the update. Moreover, as the number of network objects increases, performance issues arise at the manager responsible for communications with the network objects, as memory and storage must be used for maintaining a larger number of data exchange and communication contexts.

A second approach is a three-tiered approach in which an intermediary component is provided between the manager and the network objects being managed. Use of the intermediary component addresses some of the disadvantages of the two-tier approach. However, the intermediary components use a vendor specific network management protocol to communicate with network objects that are provided by the same vendor. For example, a manager may be used with Cisco wireless LAN controllers and Cisco Access Points. Accordingly, a management component is installed on each of the network objects being managed. This management component is the same for each network object. The intermediary component receives requests from the manager and sends the requests to the management component of the network objects.

However, in a heterogeneous network environment in which network objects are manufactured by different manufacturers and use different network management protocols, it is not possible to install a common management component on each of the network objects, because the internal structure and software of the network objects are not known and/or not accessible. For example, a network object may have a proprietary structure and software scheme. Thus, compatibility becomes a disadvantage of the three-tier approach in the heterogeneous network environment.

Exemplary embodiments address the above disadvantages. However, exemplary embodiments are not required to address the disadvantages, and a particular exemplary embodiment might not address any of the disadvantages discussed above.

Hereinafter, exemplary embodiments will be described in greater detail with reference to the accompanying drawings.

Figure 2:
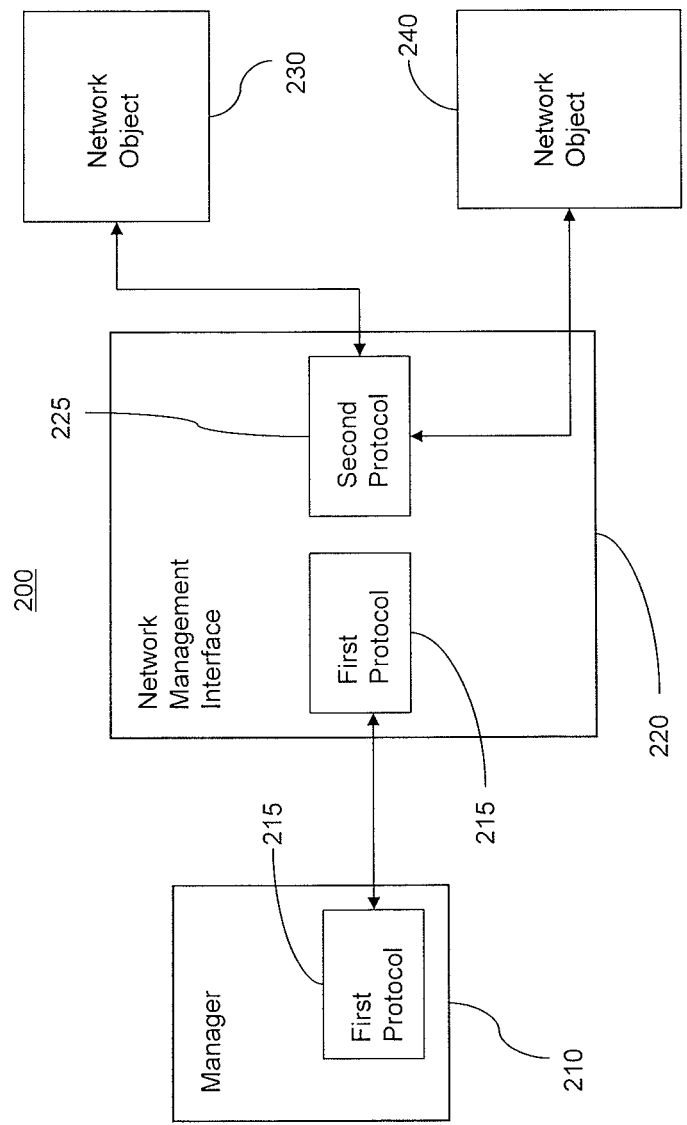
FIG. 2 is a view illustrating a schematic configuration of a network management system according to an exemplary embodiment.

FIG. 2 is a view illustrating a configuration of a network management system according to an exemplary embodiment. As shown in FIG. 2, the network management system 200 includes a manager 210, a network management interface (NMI) 220, and network objects 230, 240. Although two network objects 230, 240 are shown in FIG. 2, this is only for convenience of description, and one of ordinary skill in the art will understand that one network object or more than two network objects may be coupled to the NMI 220. That is, any number of network objects may be provided.

The manager 210 may be coupled to the NMI 220 using either a wired or wireless connection. Examples of a wired connection include Ethernet, universal serial bus (USB), firewire, serial connection, etc. Examples of a wireless connection include WiFi, Bluetooth, IEEE standards-based connections, etc. The manager 210 communicates with the NMI 220 using a communications protocol (not shown in FIG. 2) such as TCP/IP, Novell Network, or similar low level communications protocol. Similarly, the NMI 220 may be coupled to the network objects 230, 240 using either a wired or wireless connection. Any combination of connection configurations between the manager 210 and the NMI 220, and between the NMI 220 and network objects 230, 240 may be used. For example, the manager 210 may be coupled to the NMI 220 using an Ethernet connection over the internet, and the network object 230 may also be coupled to the NMI 220 over an Ethernet connection while the network object 240 may be coupled to the NMI 220 using a serial connection. However, one of ordinary skill in the art will understand that this is only an example and many different connection configurations are possible.

The manager 210, NMI 220, and network objects 230, 240 may be provided as part of the same local area network (LAN) or as part of a wide area network (WAN). Thus, the manager 210, the NMI 220 and the network objects 230, 240 may be located locally, such as in one industrial plant or within one office building. Alternatively, the NMI 220 and the network objects 230, 240 may be located locally with a same industrial plant or office, and the manager 210 may be provided remotely at an off-site location so as to provide remote network management of the NMI 220 and network objects 230, 240.

The network objects 230, 240 may be any network object that is capable of being managed on the network. For example, the network objects 230, 240 may be any of the types of network objects shown in FIG. 1. Thus, the network objects 230, 240 may be infrastructure devices such as routers 140; switches 120, 130, 150; access points 132, 134, 136; and wireless LAN controllers 125. The network objects 230, 240 may also be various computing devices, such as servers 110; workstations 170, 180; printers 160; and portable computing devices 133, 135 such as personal data assistants (PDAs) and mobile terminals. As discussed above with respect to FIG. 1, new network objects capable of interacting over a network are constantly being developed by various manufacturers. Thus, the network objects 230, 240 are not particularly limited, and may be any network object that is capable of being provisioned and configured on the network.

As discussed above, it is common that the network objects are not all the same. In other words, a given network will usually include network objects that are manufactured by one or more different vendors and/or manufacturers, and operate according to one or more network management protocols. Some examples of legacy network management protocols are SNMP (rfc1157), NetConf (rfc4741), IOS (Cisco), TiMOS (Alcatel-Lucent), JunOS (Juniper), and Diameter (rfc3588). Additionally, manufacturers often have their own proprietary network object structures, configurations, and network management protocols, which also may be legacy protocols.

The manager 210 may be, for example, a personal computer, workstation, or handheld computing device that is capable of being coupled to the network. The manager 210 runs a computer program that provides a user interface by which a network administrator can perform centralized network management functions. Thus, a network administrator (not shown) operating the manager 210 is able to perform functions to provision and configure the NMI 220 and also the network objects 230, 240 on the network.

The NMI 220 is a personal computer, workstation, or server that acts as an interface between the manager 210 and the network objects 230, 240 to which the NMI 220 is coupled. The NMI 220 is provided separately from the manager 210.

As discussed above, the manager 210 runs a network management computer program. The network management computer program is configured to communicate with the NMI 220 using a first protocol 215. The first protocol 215 is a network management protocol and, in certain exemplary embodiments, may be a management information exchange protocol, which will be described in more detail below. One of ordinary skill in the art will understand that the first protocol 215 is a higher level protocol than a communications protocol such as TCP/IP, Novell Network, and the like. Network management information is formatted using the first protocol 215 and is packetized and sent to the NMI 220 using the communications protocol.

The NMI 220 also runs a computer program that is configured to communicate with the manager 210 using the first protocol 215. The NMI 220 is also configured to communicate with the network objects 230, 240 using a second protocol 225. The second protocol 225 is also a network management protocol and is different than the first protocol 215. The second protocol 225 is a network management protocol of the network objects 230, 240 and thus allows communication of network management information between the NMI 220 and the network objects 230, 240. In other words, the NMI 220 is programmed with a module or modules for implementing the network management protocol of the network objects 230, 240 to which the NMI 220 is coupled. In FIG. 2, the network objects 230, 240 are shown as both communicating using the second protocol 225. However, this is only an example, and one of ordinary skill in the art will understand that the second protocol 225 may actually be separate protocols, one unique to the network object 230 and one unique to the network object 240. Such a situation may arise where the network objects 230, 240 are manufactured by different manufacturers, or by a same manufacturer but using different network management protocols.

Figure 3:
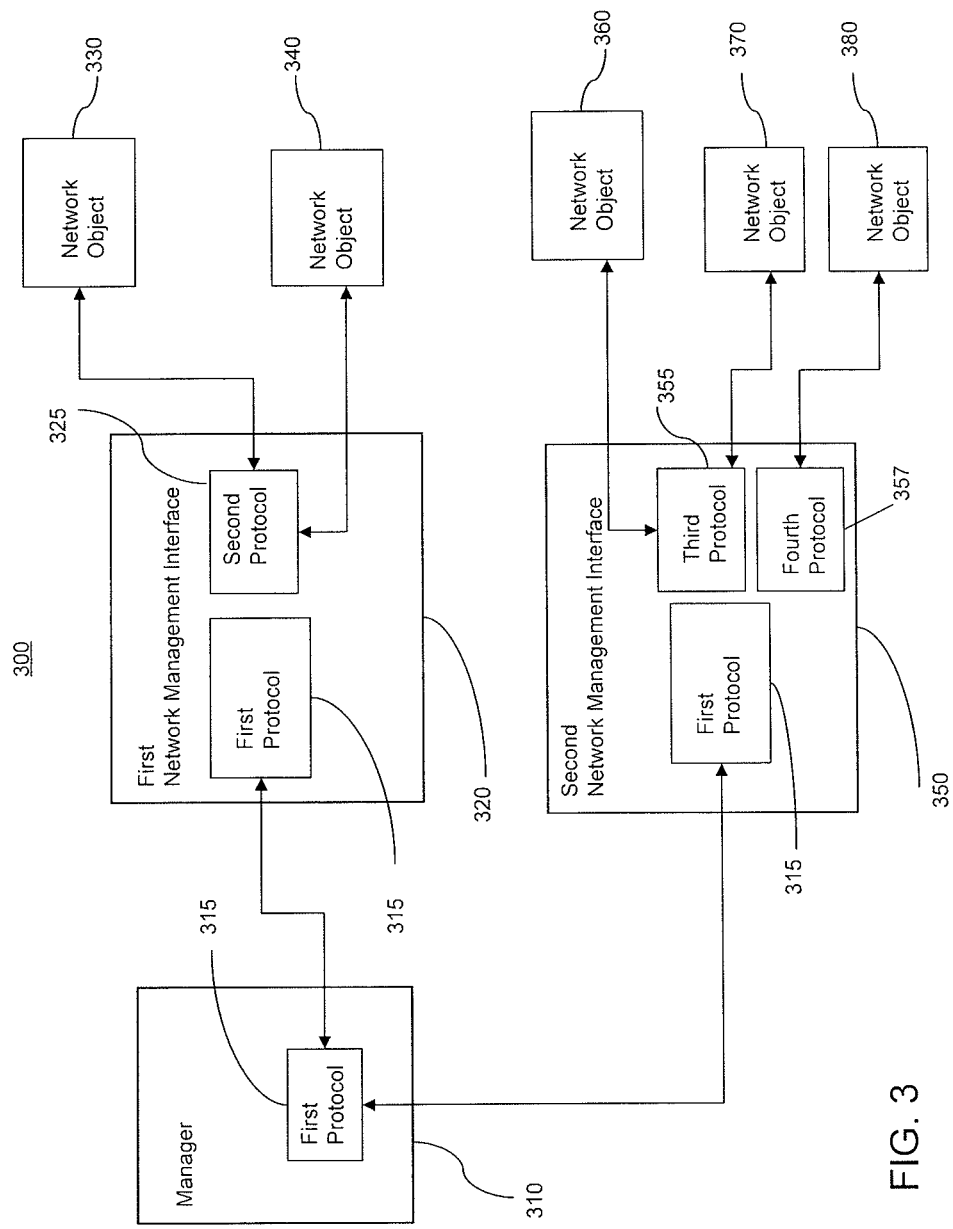
FIG. 3 is a view illustrating a schematic configuration of a network management system according to another exemplary embodiment.

FIG. 3 is a view illustrating a schematic configuration of a network management system according to another exemplary embodiment. As shown in FIG. 3, the network management system 300 according to this exemplary embodiment includes a manager 310, a first NMI 320, and network objects 330, 340. The manager 310 and first NMI 320 are each configured to communicate network management information with each other using a first protocol 315, and the first NMI 320 configured to communicate network management information with the network objects 330, 340 according to a second protocol 325. The manager 310, first NMI 320, first protocol 315, second protocol 325, and network objects 330, 340 are the same as those in FIG. 2, and thus repeated description will be omitted.

The network management system 300 further includes a second NMI 350. The second NMI 350 is coupled to network objects 360, 370, and 380. Similar to the first NMI 320, the second NMI 350 is configured to communicate network management information with the manager 310 using the first protocol 315. However, in this exemplary embodiment, the second NMI 350 is also configured to communicate using a third protocol 355 and a fourth protocol 357. The NMI 350 uses the third protocol 355 to communicate with network objects 360 and 370, and uses the fourth protocol 357 to communicate with network object 380. In this configuration, the third protocol 355 is unique to the network objects 360, 370, which may, for example, be provided by a same manufacturer. The fourth protocol 357 is unique to the network object 380, which may be provided by a different manufacturer than the network objects 330, 340, 360, 370. One of ordinary skill in the art will understand that alternatively the network object 380 may be coupled to an additional NMI such that the additional NMI handles the network object 380 which is provided by a different manufacturer and/or uses a different network control protocol. In other words, the additional NMI would be configured to communicate network management information using the fourth protocol.

Thus, according to the exemplary embodiment shown in FIG. 3, the first NMI 320 is provided to handle network objects 330, 340 from one manufacturer, and the second NMI 350 is provided to handle network objects 360, 370, 380 from manufacturers different than the manufacturer of the network objects 330, 340. Accordingly, flexibility in configuration is increased. Additionally, when a network object that is from a new, different manufacturer and/or that uses a new, different network management protocol is added to the network, a network administrator can either modify one of the existing NMI on the network, or can add an additional NMI in order to handle the new network management protocol. Thus, additional network objects may be added to the network and configured without taking existing NMIs offline, and scalability may similarly be increased.

In the exemplary embodiment shown in FIG. 3, the second NMI 350 includes the third protocol 355 and the fourth protocol 357. However, alternatively, according to another exemplary embodiment, the second NMI 350 may include the second protocol 325 of the first NMI 320 instead of the third and fourth protocols. Such a case may be advantageous, for example, where network objects 330, 340, 360, 370, and 380 are provided by a same manufacturer and use the same network management protocol, but where the network objects 330 and 340 are physically separated from network objects 360, 370, 380 by a large distance. In such a case, the first NMI 320 and second NMI 350 may each be placed in closer proximity to their respective network objects. In other words, the number of network management interfaces does not necessarily depend on the number of network management protocols.

Figure 4:
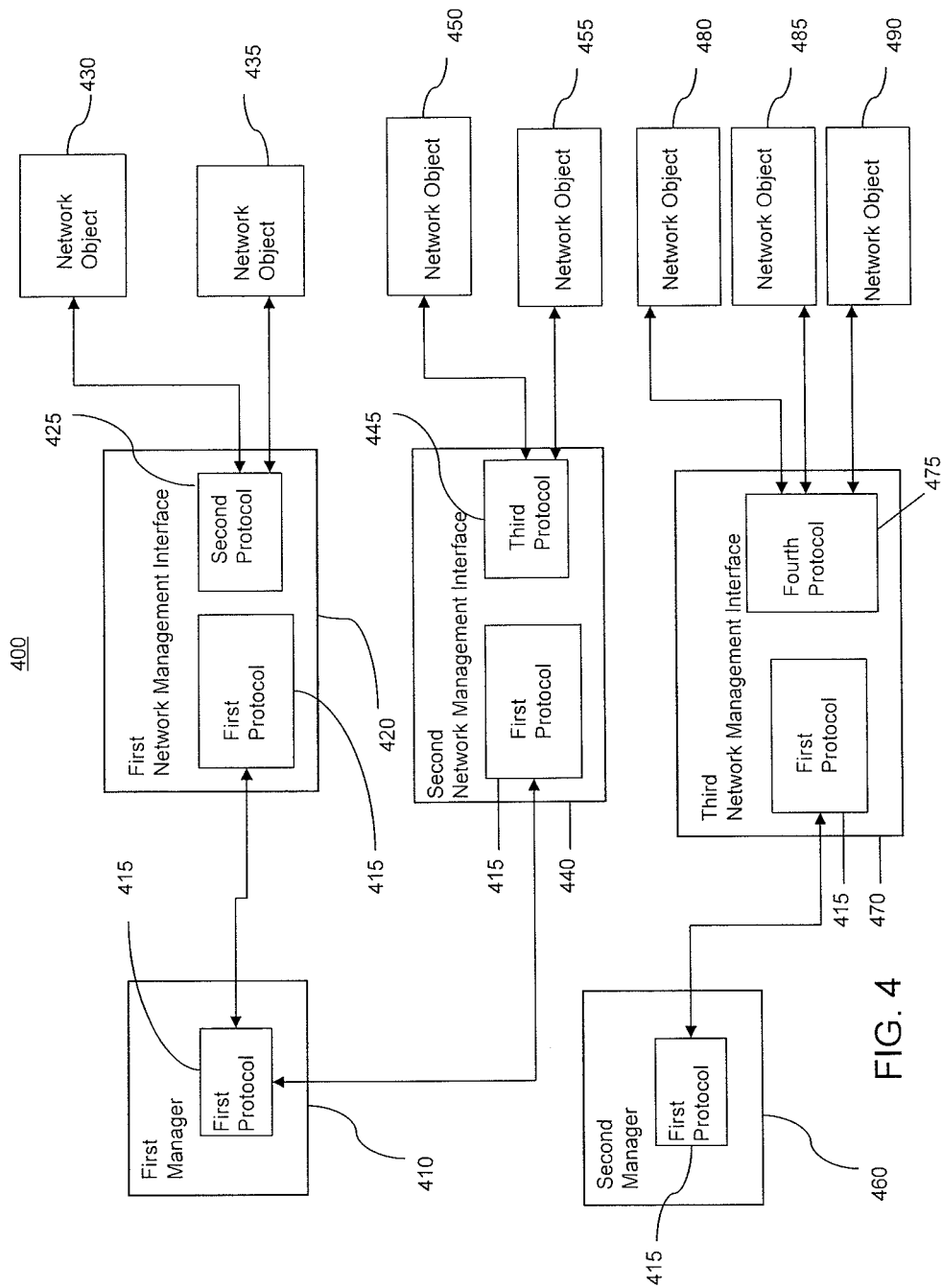
FIG. 4 is a view illustrating a schematic configuration of a network management system according to another exemplary embodiment.

FIG. 4 is a view illustrating a schematic configuration of a network management system according to another exemplary embodiment. As shown in FIG. 4, the network management system 400 according to this exemplary embodiment includes a first manager 410, a first protocol 415, a first NMI 420, a second protocol 425, a second NMI 440, a third protocol 445, and network objects 430, 435, 450, and 455. These elements are substantially the same as the manager 310, first protocol 315, first NMI 320, second protocol 325, second NMI 350, third protocol 355, and network objects 330, 340, 360, 370 shown in FIG. 3. Accordingly, repeated description of these elements will be omitted.

The network management system 400 of FIG. 4 further includes a third NMI 470 which is coupled to network objects 480, 485, and 490. In this exemplary embodiment, the third NMI 470 includes the fourth protocol 475, which is substantially the same as the fourth protocol 357 of FIG. 3. However, the third NMI 470 is coupled to a second manager 460. The second manager 460 also is configured to use the first protocol 415 to communicate network management information with the third NMI 470. Thus, according to this exemplary embodiment, both the first manager 410 and the second manager 460 are provided, which provides additional scalability and flexibility.

Figure 5:
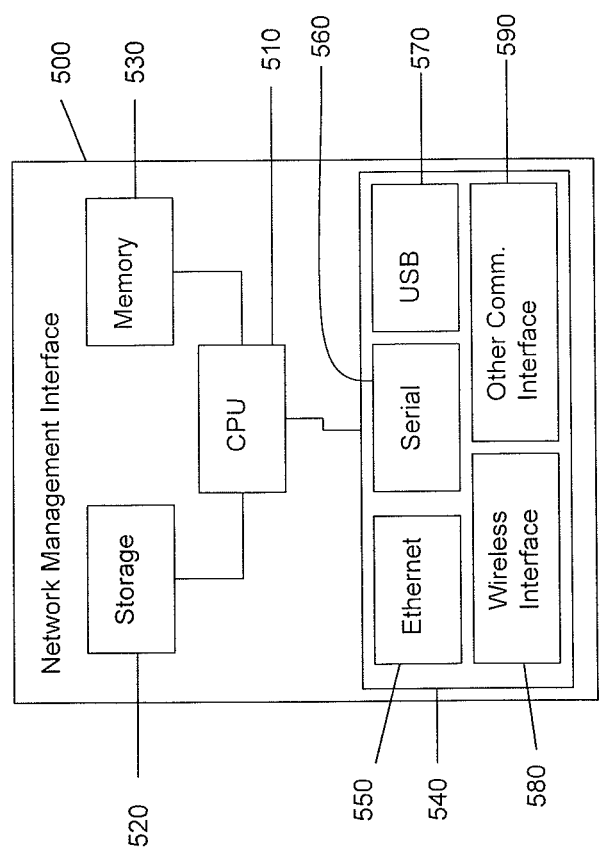
FIG. 5 is a view illustrating a structural configuration of a network management interface (NMI) according to an exemplary embodiment.

FIG. 5 is a view illustrating a structural configuration of a network management interface (NMI) according to an exemplary embodiment. As shown in FIG. 5, the NMI 500 includes a central processing unit (CPU) 510, a storage 520, a memory 530, and a communications interface 540. The communications interface 540 includes an Ethernet interface 550, a serial interface 560, a USB interface 570, a wireless interface 580 and an other communications interface 590. The CPU 510 is connected to and controls the operation of the storage 520, the memory 530, and the communications interface 540. A computer program that is configured to communicate network management information to the manager using the first protocol, and to one or more network objects using one or more additional protocols (i.e., one or more of the second, third, fourth protocols discussed above) is stored in the storage 520 and/or the memory 530. Upon running the computer program, the CPU 510 operates to format the network management information according to one or more network management protocols and to control communication of the formatted information through the communications interfaces 540.

Figure 6:
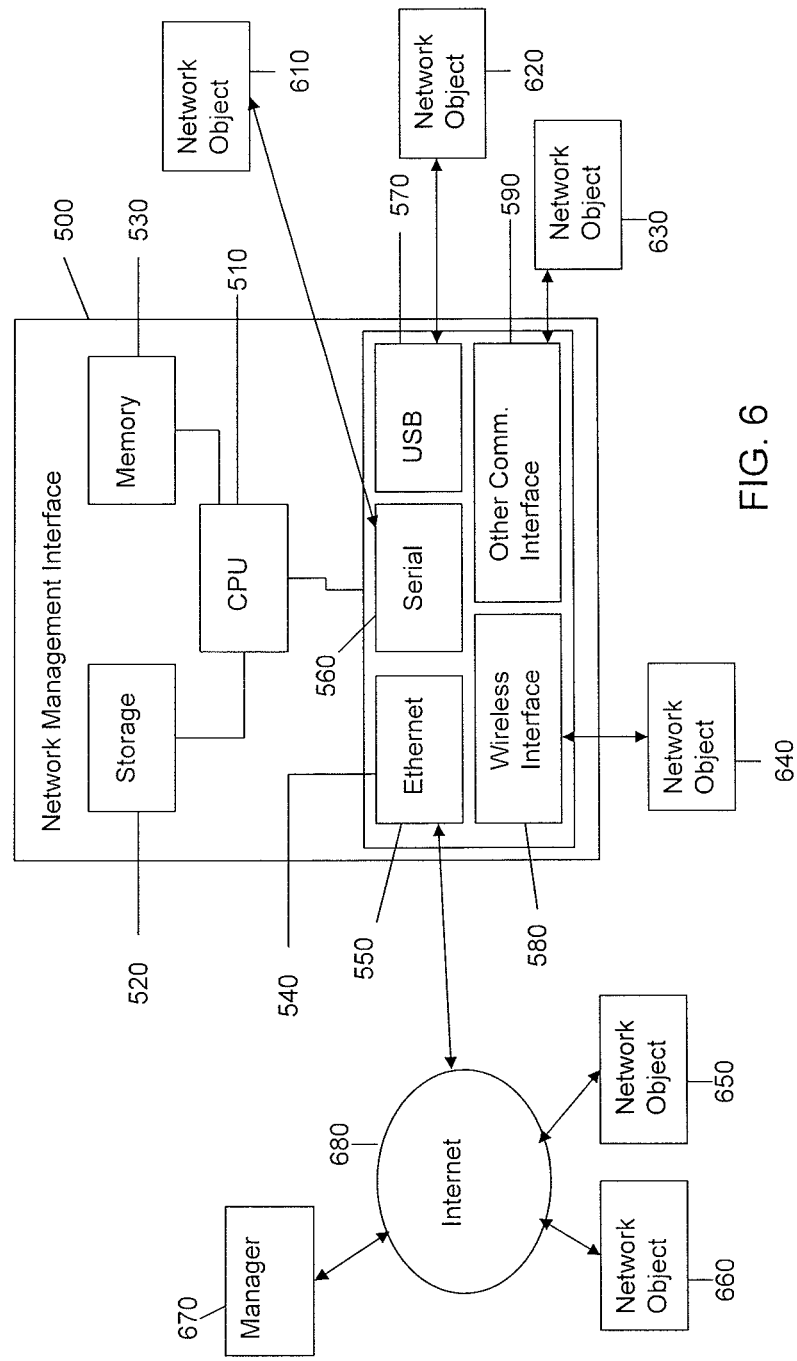
FIG. 6 is a view illustration a configuration of an NMI with network devices according to an exemplary embodiment.

FIG. 6 shows an example of connections to the NMI 500. The NMI 500 may be connected to a manager 670 and network objects 650, 660 through Internet 680 and the Ethernet interface 550. The NMI 500 may be connected to network object 640 using the wireless interface 580, network object 630 using the other communication interface 590, network object 620 using USB interface 570, and network object 610 using serial interface 560. The network objects 610, 620, 630, 640, 650, and 660 may correspond to any of the network objects described above, and the manager 670 may correspond to any of the managers described above.

Figure 7:
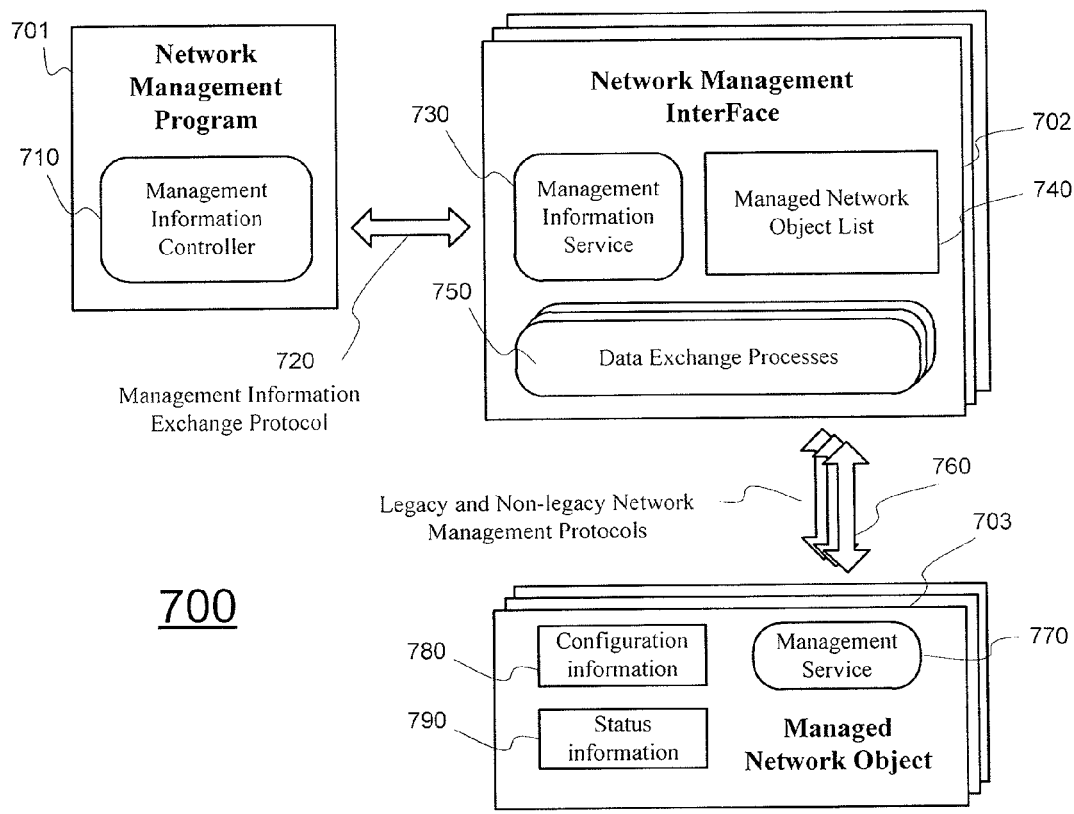
FIG. 7 is a functional block diagram of a network management system according to an exemplary embodiment.

FIG. 7 is a functional block diagram of a network management system according to an exemplary embodiment. As shown in 7, the network management system 700 includes a manager 701, one or more NMIs 702, and one or more network objects 703. However, the one or more NMIs will be collectively referred to by NMI 702, and the one or more network objects will be referred to by network object 703.

The manager 701 includes a network management program that runs on the manager 701 and provides a user interface by which the network administrator may manage the network. The network management program includes a management information controller module 710 for exchanging network management information with the NMI 702 according to a management information exchange protocol 720. The NMI 702 includes a network management interface program that provides a management information service module 730 for communicating directly with the manager 701 using a management information exchange protocol 720, and for creating data exchange processes 750 for communicating directly with the network objects 703 to communicate network management information with the network objects 703.

The network management program of the manager 701 uses the management information controller module 710 to send requests to the NMI 702 to read and write network management information from and to the network objects 703. The management information exchange protocol 720 is used to format and transport the requests and the responses between the management information controller module 710 of the manager 701 and the network management interface 702.

The management information controller module 710 provides two functions. The first function is to exchange information with the network objects 703 through the NMI 702. The management information controller module 710 creates request messages and sends the request messages to the NMI 702 over the network using the management information exchange protocol 720. The management information controller module 710 is also responsible for receiving and processing response messages from the NMI 702. The management information controller module 710 thus forward network management information received from the NMI 702 to the network management program of the manager 701.

The second function of the management information controller module 710 is to manage the NMI 702. The management information controller module 710 thus allows the network administrator using the manager 701 to remotely configure the NMI 702 by sending management messages to the NMI 702. Such management messages are formatted according to the management information exchange protocol 720 and sent to the NMI 702 over the network.

A single management information controller module 710 may communicate with one or more NMIs 702.

The management information exchange protocol 720 specifies two categories of messages. The first category of messages is related to reading and writing network management information from and to network objects 703. The second category of messages is related to the maintenance and configuration of the NMI 702.

The network management interface program of the NMI 702 includes a management information service module 730, a network object list 740, and one or more data exchange processes 750.

Network object list 740 includes information and parameters related to the network objects 703 with which the NMI 702 can communicate. The information and parameters may include, for example, specification of the network management protocols of the network objects 703 and parameters for reading and writing network management information to each network object 703, identification of what network management information can be read or written to each network object 703, and specific commands used for reading and writing the information.

Figure 8:
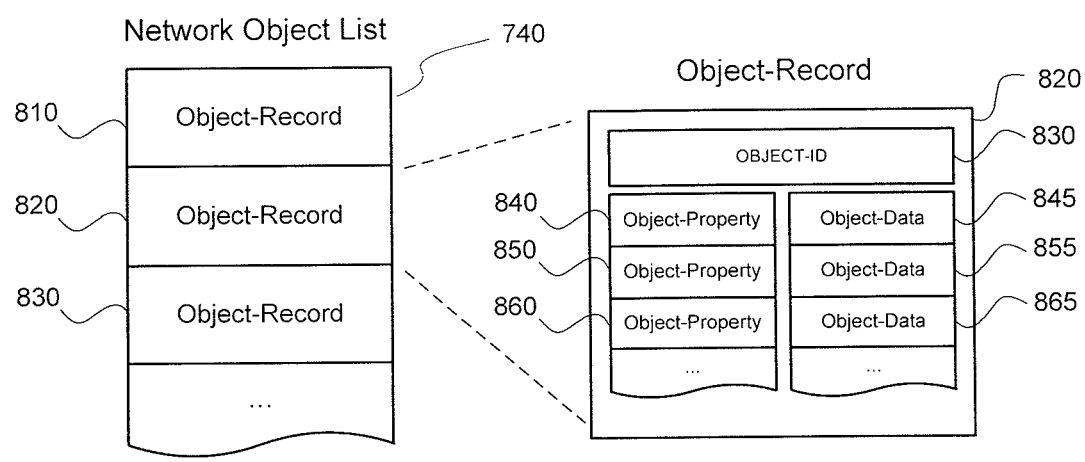
FIGS. 8 and 9 are an example of a network object list of a network management interface (NMI) shown in FIG. 7.
Figure 9:
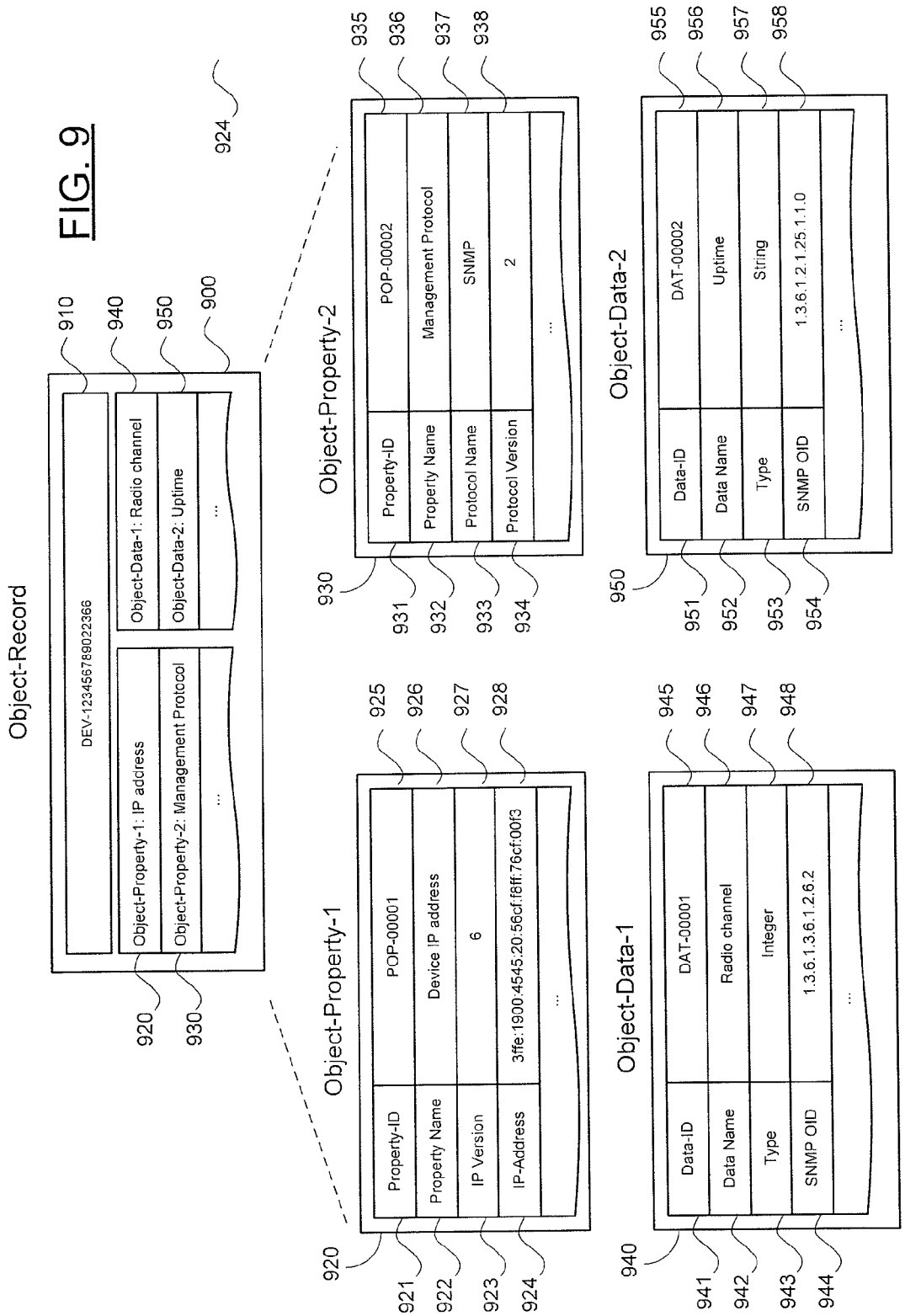

FIGS. 8 and 9 show an example of a network object list 740. As shown in FIG. 8, the network object list 740 includes object records 810, 820, 830, etc. Each object record, for example object record 820, includes an object identifier (ID) 830, one or more object-properties 840, 850, 860, etc. and one or more object-data 845, 855, 865, etc.

FIG. 9 shows a non-limiting example of an object record. The object record has an object-ID 910 of "DEV-123456789022366", and includes object-properties 920, 930 of an "IP address" and a "Management Protocol", respectively, and object-data 940, 950 of a "Radio channel" and an "Uptime", respectively. The object-property 920 has fields including a Property-ID 921, a Property Name 922, an IP Version 923, and an IP-Address 924 with corresponding value fields 925-928 with values of "POP-00001", "Device IP address", "6", and "3ffe:1900:4545:20:56cf:f8ff:76cf:00f3", respectively. The object-property 930 has fields including a Property-ID 931, a Property Name 932, a Protocol Name 933, and a Protocol Version 934 with corresponding value fields 935-938 having values of "POP-00002", "Management Protocol", "SNMP", and "2", respectively. The object-data 940 has fields including Data-ID 941, Data Name 942, Type 943, and SNMP OID 944 with value fields 945-948 having values of "DAT-00001", "Radio channel", "Integer", and "1.3.6.1.3.6.2.6.2", respectively. The object-data 950 has fields including Data-ID 951, Data Name 952, Type 953, and SNMP OID 954 with corresponding value fields 955-958 having values of "DAT-00002", "Uptime", "String", and "1.3.6.1.2.1.25.1.1.0", respectively. It is to be noted that these fields are only examples, and more or fewer fields may provided. Additionally, it should be noted that these are only examples, and any properties and data may be specified in the network object list 740.

Turning back now to FIG. 7, the management information service module 730 receives, sends, and processes messages from the management information controller modules 710 of one or more managers 701. When a request message is received by the management information service module 730, the request is processed according to the type of network management information contained in the message.

The data exchange processes 750 are created by the management information service module 730 for reading or writing network management information to and from a given network object 703. Each data exchange process 750 when created is provided with information related to the tasks assigned to the process. The data exchange process refers to the network object list 740 to obtain detailed information on how to perform the read or write operations. The data exchange processes 750 may also be used to perform periodic communication with the network objects 703.

Figure 10:
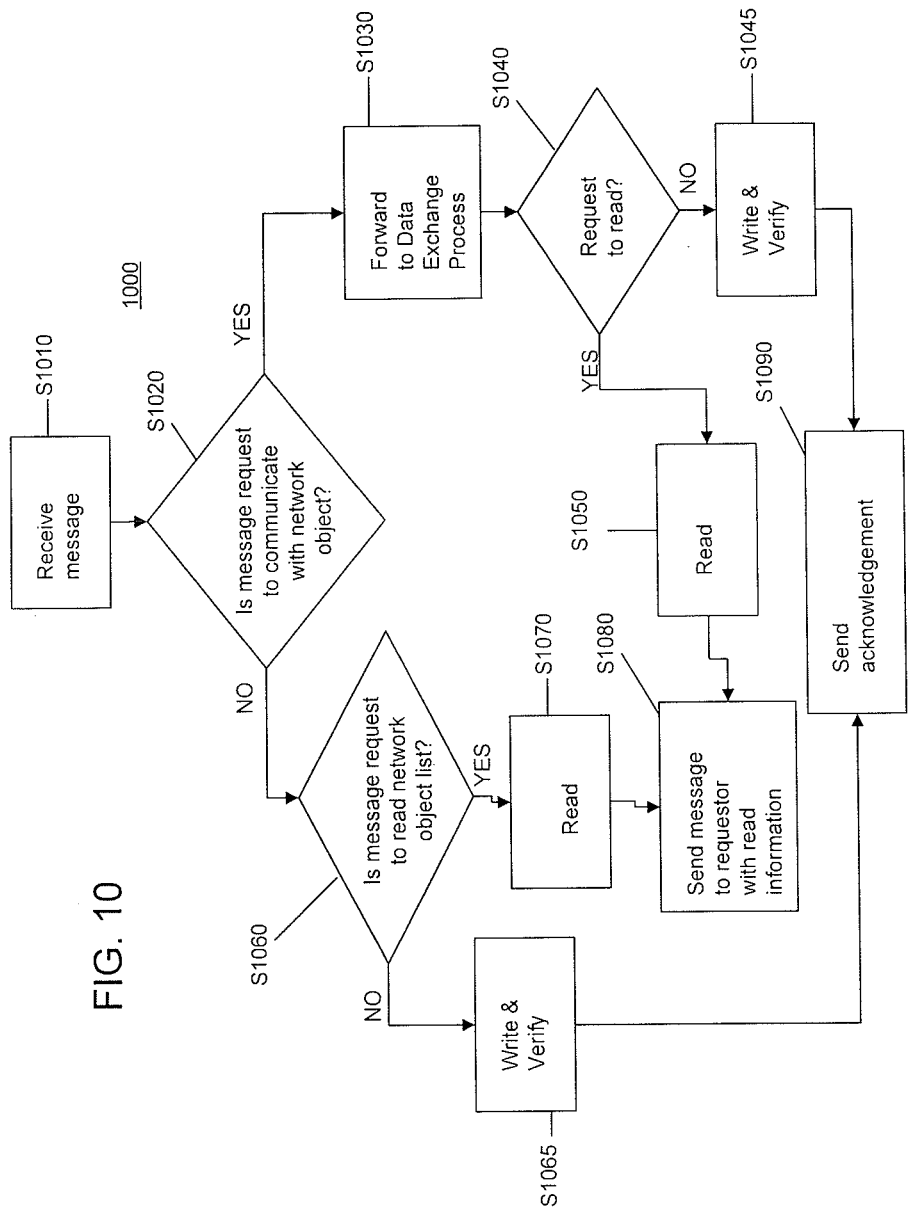
FIG. 10 is an example of a flowchart showing the operation of an NMI according to an exemplary embodiment.

The processing performed by the management information service module 730 will be described below in more detail with reference to the flowchart shown in FIG. 10, which shows an example of the process according to an exemplary embodiment.

The process 1000 begins by the management information service module 730 receiving a message in operation S1010. In operation S1020, it is then determined whether the message is a request for communicating network management information with a network object.

If the message is a request for communicating network management information with a network object (S1020: YES), the message is forwarded to a data exchange process in operation S1030, and it is determined whether the message is a request for reading network management information in operation S1040.

If the message is not a request for reading network management information (S1040: NO), the message is a request for writing network management information. The network management information is then written to the network object and verified in operation S1045, and an acknowledgement is sent to the requestor to notify the requestor of the success or failure of the write operation in operation S1090.

If the message is a request for reading network management information (S1040: YES), the network management information is read from the network object in operation S1050, and a message is sent to the requestor containing the read information in operation S1080.

Returning to operation S1020, if the message is not a request for communicating network management information with a network object (S1020: NO), then it is determined whether the message is a request for reading information from the network object list in operation S1060. If the message is a request for reading information (S1060: YES), then the requested information is read from the network object list in operation S1070, and a message is sent to the requestor with the read information in operation S1080.

If the request is not for reading information from the network object list (S1060: NO), then the request is for writing information to the network object list. The information is written to the network object list and verified in operation S1065. Then, an acknowledgement is sent to the requestor to notify the requestor of the success or failure of the write operation in operation S1090. After sending the acknowledgement, the process ends. It is noted that the acknowledgement operation is optional and may be omitted in some cases.

Figure 11:
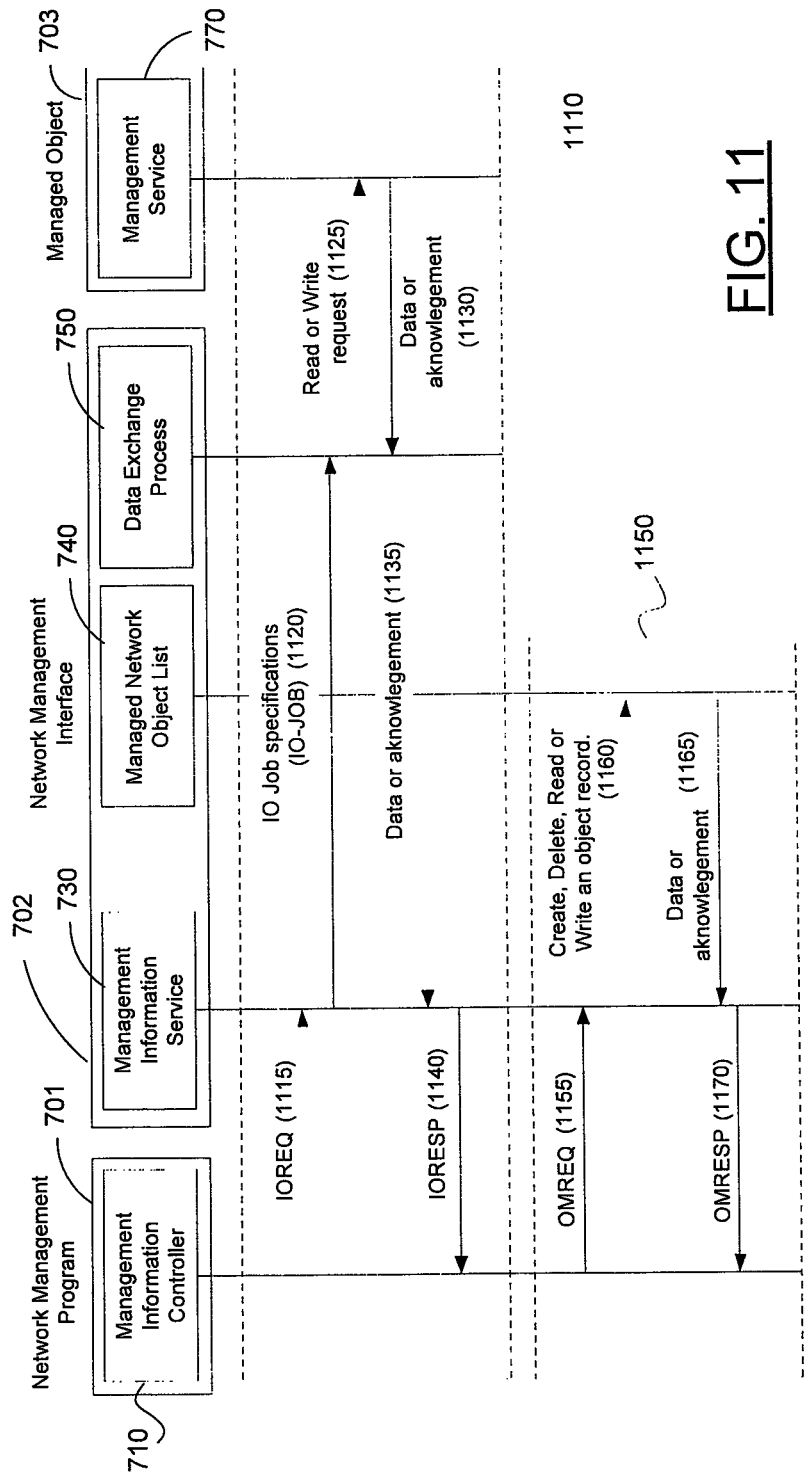
FIG. 11 is an example of an activity diagram showing messaging operations in a network management system according to an exemplary embodiment.

FIG. 11 is an example of an activity diagram showing messaging operations in a network management system according to an exemplary embodiment. With reference to FIGS. 7 and 11, a non-limiting example of a management information exchange protocol will be described.

For example, the management information exchange protocol 720 (see FIG. 7) may specify at least two categories of messages communicated between the centralized network management program of the manager 701 and the network management interface program of the NMI 702. The first category of messages is I/O messages for reading and writing management information to and from the network objects 703 through the NMI 702. The second category of messages is management messages for managing the NMI 702.

I/O messages 1110 (see activity chart in FIG. 11) are used to remotely read and write network management information to and from the network objects 703 through the NMI 702. The I/O messages may include I/O request (IOREQ) messages and I/O response (IORESP) messages.

The following is an example of a specification for an I/O Request message (IOREQ) message:
  IOREQ=MSG-TYPE, sequence-of IO-JOB
  IO-JOB=ACCESS-MODE, OBJECT-ID, DATA-ID, (DATA), (READ-INTERVAL)

When the network management program of the manager 710 performs communications, such as reading and/or writing operations, with a given network object 703, the management information controller module 710 of the network management program of the manager 701 sends an IOREQ message (1115) that contains one or more read and write jobs (Sequence of IO-JOB structures) to the management information service module 730 of the appropriate NMI 702 associated with the given network object 703.

Each read or write job specifies a type of the operations (ACCESS-MODE is used to specify whether reading or writing), a unique identifier of the corresponding object (OBJECT-ID) and an identifier of the data (DATA-ID). The OBJECT-ID and DATA-ID include values that correspond, respectively, to an Object-Record and Object-Data record in the network object list of the NMI. The request may also include a parameter to specify a read frequency (READ-INTERVAL) in the case that the centralized network management program, for example, periodically monitors status information in the network object 703. In case of a write request, the data to be written is included in the job request (DATA). The management information service 703 of the NMI 702 creates a data exchange process 750 and forwards the I/O job specifications (IO-JOB) (1120) to the data exchange process. The data exchange process 750 then carries out the read or write request according to the job (1125) with the network object 703, and receives either data or acknowledgement (1130) from the network object 703 as the case may be. The data exchange process 750 then forwards the data or acknowledgement (1135) to the management information service module 730.

The following is an example of a specification for an I/O Request message (IORESP) message:
  IORESP=MSG-TYPE, sequence-of IO-RESPONSE
  IO-RESPONSE=ACCESS-MODE, OBJECT-ID, DATA-ID, (DATA), (READ-INTERVAL), STATUS When a read or write operation is completed, an IORESP response message (1140) is sent by the management information service module 730 of the NMI 702 to the management information controller module 710 of the manager 701. The response message includes one or more outcomes (Sequence of IO-RESPONSE structures) from the read and write jobs that were requested by the management information controller module 710. Each outcome includes information about the requested job operation (ACCESS-MODE, OBJECT-ID, DATA-ID and READ-INTERVAL) and information about the success or failure of the read or write operation (STATUS). In the case of a requested read operation, the information that was requested to be read from the network object 703 is included in the response (DATA).

As described above, the second category of messages is management messages for managing the NMI 702. Management messages 1150 (see activity chart in FIG. 11) are used to maintain the network object list 740 of the NMI 702. The management messages may include object management request (OMREQ) messages and an object management response (OMRESP) messages.

The following is an example of a specification for an object management request (OMREQ) message:
  OMREQ=MSG-TYPE, sequence-of OM-JOB
  OM-JOB=OPERATION, OBJECT-ID, (PROPERTY-ID), (DATA)

The operations that may be performed on the network object list 740 include, for example, creating and deleting object-record entries and reading and modifying object-properties and object-data.

When the network management program of the manager 701 performs managing operations, such as creating, deleting, reading or modifying, of the network object list 740 of a given NMI 702, the management information controller module 710 of the network management program of the manager 701 sends an OMREQ message (1155) to the management information service module 730 of the NMI 702 specifying the type of operation to be carried out (using the OPERATION field) and the relevant information for carrying out the operation (OBJECT-ID, PROPERTY-ID, DATA, READ-INTERVAL). The OBJECT-ID and PROPERTY-ID include values that correspond, respectively, to an Object-Record and Object. Property record in the network object list of the NMI.

When deleting or creating an empty Object-Record, the identifier of the object (OBJECT-ID) alone may be indicated. However, when writing or reading object properties, the identifier of the property to be read or modified is specified (PROPERTY-ID) in addition to the object (OBJECT-ID). For writing operations, the data to be written is also provided (DATA). The management information service module 730 then creates, deletes, reads, or writes an object record (1160) according to the request, and data or an acknowledgement (1165) may be returned to the management information service module 730.

The following is an example of a specification for an object management response (OMRESP) message:
  OMRESP=MSG-TYPE, sequence-of OM-RESPONSE
  IO-RESPONSE=OPERATION, OBJECT-ID, (PROPERTY-ID), (DATA), STATUS When the management operation (create, delete, read or write) is completed, an OMRESP response (1170) message is sent by the management information service module 730 of the NMI 702 to the management information controller module 710 of the manager 701. The response message includes one or more outcomes (Sequence of OM-RESPONSE structures) resulting from the management jobs that were requested by the management information controller module 710. Each outcome contains information about the requested job operation (OPERATION, OBJECT-ID and PROPERTY-ID) and information about the success or failure of the operation (STATUS). In the case of a read operation, the information that was read from the network object list 740 is included (DATA).

Figure 12:
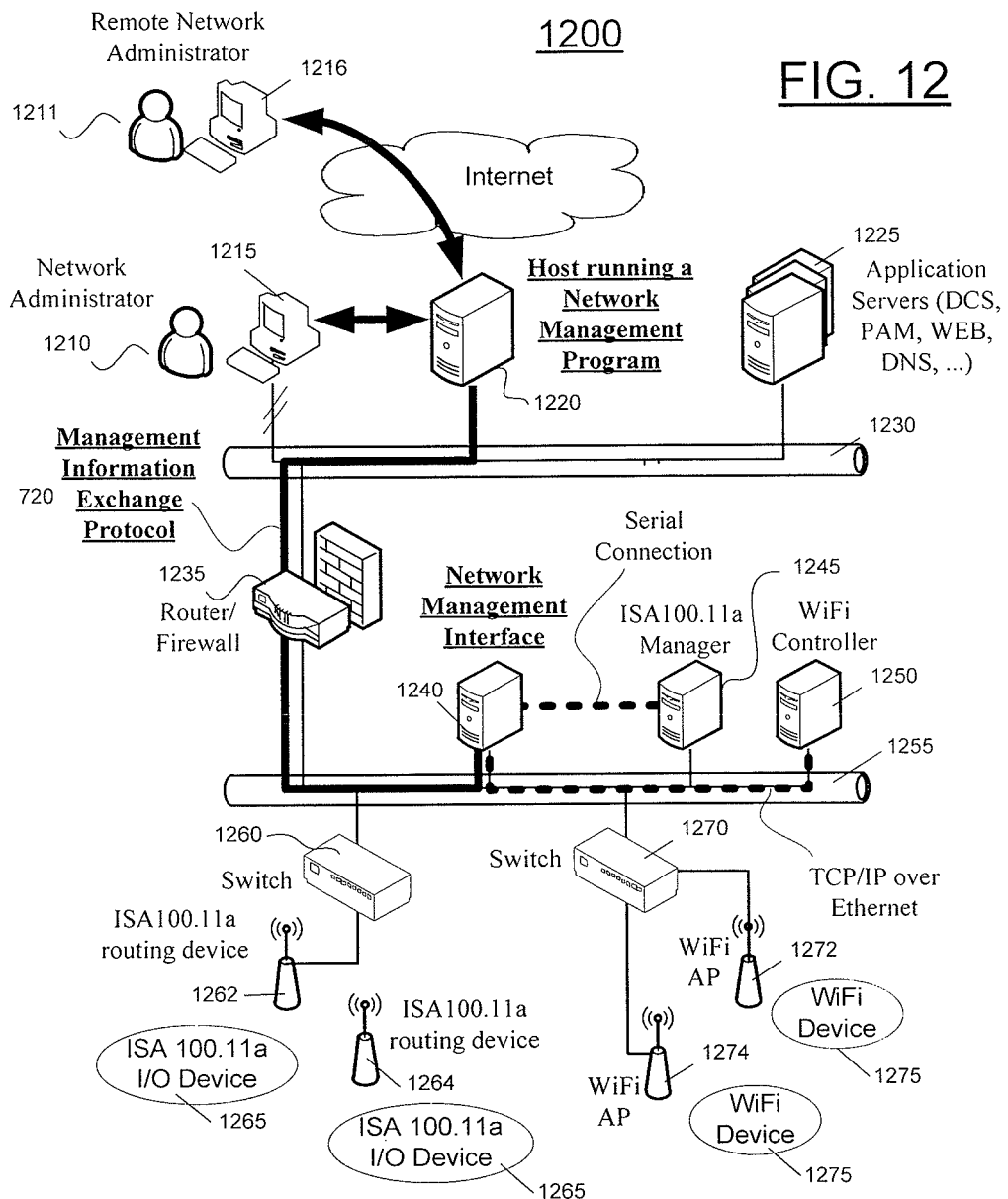
FIG. 12 is an example showing a network management interface in a network management system according to an exemplary embodiment.

FIG. 12 illustrates a non-limiting example showing a network management interface in a network management system according to an exemplary embodiment. As shown in the network 1200 in FIG. 12, two communication technologies, i.e., WiFi/IEEE 802.11 and ISA100.11a, are provided. Each of the communications technologies are used by various network objects, including infrastructure objects (e.g., WiFi Access Points (AP) 1274, 1272; switch 1270; ISA100.11a routing devices 1262, 1264; and switch 1260), end node objects (e.g., WiFi devices 1275 and ISA100.11a I/O devices 1265), and management objects (e.g., WiFi Controller 1250 and ISA100.11a manager 1245). These infrastructure objects, end node objects, and management objects constitute the set of network objects that are managed by the centralized network management program running on host server 1220.

A serial interface connection may be used to connect the NMI 1240 to the ISA100.11a manager 1245, and a TCP/IP connection over an Ethernet network may be used to communicate with the WiFi controller 1250. A network administrator 1210 connects at terminal 1215 to the centralized network management application running on the host server 1220 to monitor and control the network objects being managed. Messages exchanged between the centralized network management application running on the host server 1220 and the NMI 1240 using the management information exchange protocol are formatted according to the management information exchange protocol and relayed using a communication protocol to a router/firewall 1235. Once received by the NMI 1240, the messages are read and formatted according to the network management protocol for WiFi/IEEE 802.11 or ISA100.11a and sent using the appreciate TCP/IP or serial communication protocol to the network object. Alternatively or additionally to network administrator 1210, a remote network administrator 1211 may access host server 1220 through terminal 1216 through the Internet. In other words, multiple network administrators may access host server 1220 through terminals and use the host server 1220 to run the network management program to interact with the NMI 1240.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus comprising:
    a central processing unit configured to receive a network management request for managing at least one of first and second network objects, the reception being performed by using a first protocol, the first protocol being used for managing a first network, the first network object being connected to a second network, the second network being different from the first network, the second network object being connected to a third network, the third network being different from the first network; and
    a memory which
        associates a first identifier and a second protocol with each other and stores the first identifier and the second protocol, the first identifier identifying the first network object, the second protocol being used for managing the second network, the second protocol being used by the first network object, the second protocol being different from the first protocol, and
        associates a second identifier and a third protocol with each other and stores the second identifier and the third protocol, the second identifier identifying the second network object, the third protocol being used for managing the third network, the third protocol being used by the second network object, the third protocol being different from the first protocol,
    wherein the central processing unit is configured to
    read, from the memory, at least one of the second and third protocols associated with the at least one of the first and second network objects managed by the network management request, and
    transmit the network management request to the at least one of the first and second network objects, the transmission being performed by using the at least one of the second and third protocols read from the memory.

2. The apparatus according to claim 1, wherein at least one of the first to third protocols is a legacy protocol.

3. The apparatus according to claim 1, wherein when the network management request is a request for managing a network object list, the central processing unit is further configured to manage the network object list according to the network management request.

4. The apparatus according to claim 3, wherein the network management request is a request to update the network object list, and the central processing unit is further configured to transmit, using the first protocol, a response indicating that the network object list has been updated.

5. The apparatus according to claim 1, wherein the central processing unit is further configured to receive, using the at least one of the second and third protocols, a response to the network management request from the at least one of the first and second network objects that received the network management request, and transmit the received response using the first protocol.

6. The apparatus according to claim 1, further comprising:
    a plurality of communication interfaces, each of the first and second network objects being connected to at least one of the plurality of communication interfaces,
    wherein a network object list includes a network management information, the network management information being for each of the first and second network objects, the network management information regarding the at least one of the plurality of communication interfaces to which the at least one of the first and second network objects is connected, and
    the central processing unit is further configured to transmit the network management request to the at least one of the first and second network objects using a communications interface for the at least one of the first and second network objects based on the network management information in the network object list.

7. The apparatus according to claim 1, wherein a manufacturer of the at least one of the first and second network objects is different from a manufacturer of the apparatus.

8. The apparatus according to claim 1, wherein the network management request does not include information on the at least one of the second and third protocols used by the at least one of the first and second network objects to which the network management request is to be transmitted.

9. The apparatus according to claim 1, wherein the at least one of the second and third protocols is a legacy protocol, and the first protocol is not a legacy protocol.

10. A network management system comprising:
    a first network manager; and
    a first network management interface,
    wherein the first network management interface comprises:
    a central processing unit configured to receive a network management request for managing at least one of first and second network objects, the reception being performed by using a first protocol, the first protocol being used for managing a first network, the first network object being connected to a second network, the second network being different from the first network, the second network object being connected to a third network, the third network being different from the first network; and
    a memory which
        associates a first identifier and a second protocol with each other and stores the first identifier and the second protocol, the first identifier identifying the first network object, the second protocol being used for managing the second network, the second protocol being used by the first network object, the second protocol being different from the first protocol, and associates a second identifier and a third protocol with each other and stores the second identifier and the third protocol, the second identifier identifying the second network object, the third protocol being used for managing the third network, the third protocol being used by the second network object, the third protocol being different from the first protocol, wherein the central processing unit is configured to read, from the memory, at least one of the second and third protocols associated with the at least one of the first and second network objects managed by the network management request, and transmit the network management request to the at least one of the first and second network objects, the transmission being performed by using the at least one of the second and third protocols read from the memory, and wherein the first network management interface is connected to the first network manager and to the first and second network objects, and is configured to communicate with the first network manager using the first protocol transmitted over a communication protocol, and to communicate with the at least one of the first and second network objects.

11. The network management system according to claim 10, wherein a manufacturer of the at least one of the first and second network objects is different from a manufacturer of the first network management interface.

12. The network management system according to claim 10, further comprising:

a second network management interface that is connected to the first network manager and a third network object, the second network management interface being configured to communicate with the first network manager using the the first protocol transmitted over the communications protocol, the second network management interface communicating with the third network object according to a fourth protocol, the fourth protocol being different from the first protocol.

13. The network management system according to claim 12, wherein the fourth protocol is different from the at least one of the second and third protocols.

14. The network management system according to claim 10, further comprising:

a second network manager; and a second network management interface that is connected to the second network manager and the third network object, the second network management interface being to communicate with the second network manager using the first protocol transmitted over the communications protocol, the second network management interface communicating with the third network object according to a fourth protocol, the fourth protocol being different from the first protocol.

15. The network management system according to claim 14, wherein the fourth protocol is different from the at least one of the second and third protocols.

16. A network management interface apparatus comprising:

a central processing unit configured to receive a network management request for managing at least one of first and second network objects, the reception being performed by using a management information exchange protocol, the management information exchange protocol being used for managing a first network, the first network object being connected to a second network, the second network being different from the first network, the second network object being connected to a third network, the third network being different from the first network; and a memory which associates a first identifier and a first network management protocol with each other and stores the first identifier and the first network management protocol the first identifier identifying the first network object, the first network management protocol being used for managing the second network, the first network management protocol being used by the first network object, the first network management protocol being different from the management information exchange protocol, and associates a second identifier and a second network management protocol with each other and stores the second identifier and the second network management protocol, the second identifier identifying the second network object, the second network management protocol being used for managing the third network, the second network management protocol being used by the second network object, the second network manage protocol being different from the management inform information exchange protocol, wherein the central processing unit is configured to read, from the memory, at least one of the first and second network management protocols associated with the at least one of the first and second network objects managed by the network management request, and transmit the network management request to the at least one of the first and second network objects, the transmission being performed by using the at least one of the first and second network management protocols read from the memory.

17. The network management apparatus according to claim 16, wherein at least one of the first and second network management protocols, and the management information exchange protocol is a legacy protocol.

18. The network management apparatus according to claim 16, wherein when the network management request is a request for managing a network object list, the central processing unit is further configured to manage the network object list according to the network management request.

19. The network management apparatus according to claim 18, wherein the network management request is for updating the network object list, and the central processing unit is further configured to transmit, using the management information exchange protocol, a response indicating that the network object list has been updated.

20. The network management apparatus according to claim 16, wherein the central processing unit is further configured to receive, using the at least one of the first and second network management protocols, a response to the network management request from at least one of the first and second network objects that received the network management request, and transmit the received response using the management information exchange protocol.

* * * * *